(12) United States Patent
Geschke

(10) Patent No.: US 12,435,651 B2
(45) Date of Patent: Oct. 7, 2025

(54) CONNECTING ROD, PISTON, CRANK DRIVE, AND RECIPROCATING INTERNAL COMBUSTION ENGINE

(71) Applicants: NEWGREEN AG, Staad (CH);
NEWGREEN AMERICAN INC.

(72) Inventor: Stephan Geschke, Staad (CH)

( * ) Notice: Subject to any disclaimer, the term of this patent is extended or adjusted under 35 U.S.C. 154(b) by 0 days.

(21) Appl. No.: 18/710,458

(22) PCT Filed: Dec. 22, 2022

(86) PCT No.: PCT/EP2022/087641
§ 371 (c)(1),
(2) Date: May 15, 2024

(87) PCT Pub. No.: WO2023/118525
PCT Pub. Date: Jun. 29, 2023

(65) Prior Publication Data
US 2025/0020074 A1    Jan. 16, 2025

(30) Foreign Application Priority Data

Dec. 23, 2021    (DE) ............... 10 2021 134 519.7

(51) Int. Cl.
*F01M 1/06*    (2006.01)
*F02F 3/22*    (2006.01)

(52) U.S. Cl.
CPC .............. *F01M 1/06* (2013.01); *F02F 3/22* (2013.01); *F01M 2001/066* (2013.01)

(58) Field of Classification Search
CPC .... F01M 1/06; F01M 11/02; F01M 2001/066; F01M 2011/027; F02F 3/22; F02F 3/16; F01P 3/10; F01P 3/06; F01P 3/12; F16J 1/16; F16J 1/20; F16J 7/00
See application file for complete search history.

(56) References Cited

U.S. PATENT DOCUMENTS

| 3,739,657 | A | * | 6/1973 | Patchen | F16C 7/023 74/579 E |
| 4,269,083 | A | * | 5/1981 | Wandel | F16J 1/16 92/158 |
| 4,364,307 | A | * | 12/1982 | Paro | F01M 1/06 123/41.38 |
| 6,334,385 | B1 | * | 1/2002 | Wilksch | F02F 3/22 92/186 |
| 9,068,530 | B2 | * | 6/2015 | Hall | F02F 3/22 |
| 9,303,584 | B2 | * | 4/2016 | Weinenger | F02F 3/00 |

(Continued)

FOREIGN PATENT DOCUMENTS

| CN | 112049858 | A | * | 12/2020 | ............... | F02F 3/00 |
| DE | 102017201741 | A1 | * | 8/2018 | ............... | F01M 1/06 |

*Primary Examiner* — Grant Moubry
(74) *Attorney, Agent, or Firm* — J. Wiley Horton

(57) ABSTRACT

The invention relates to a connecting rod, in particular for a power engine, with a head region (303), a middle region (305) and a base region, wherein the head region has a first connection with a bulge for connecting a piston rotatably about the pivot axis to a connecting rod receptacle of the piston having an undercut corresponding to the bulge and the base region has a second connection for receiving a crankshaft and the head region is connected to the base region via the central region. The invention also relates to a piston, a crank mechanism and an internal combustion engine.

18 Claims, 8 Drawing Sheets

(56) References Cited

U.S. PATENT DOCUMENTS

| | | | |
|---|---|---|---|
| 2005/0139188 A1* | 6/2005 | Songen | F16J 1/22 123/197.3 |
| 2009/0084260 A1* | 4/2009 | Christopher | F16J 1/14 92/208 |
| 2015/0128920 A1* | 5/2015 | Kessler | F02B 75/28 123/61 R |
| 2019/0186309 A1* | 6/2019 | Malischewski | F16C 7/023 |
| 2024/0271586 A1* | 8/2024 | Arumugam | F02F 3/22 |

* cited by examiner

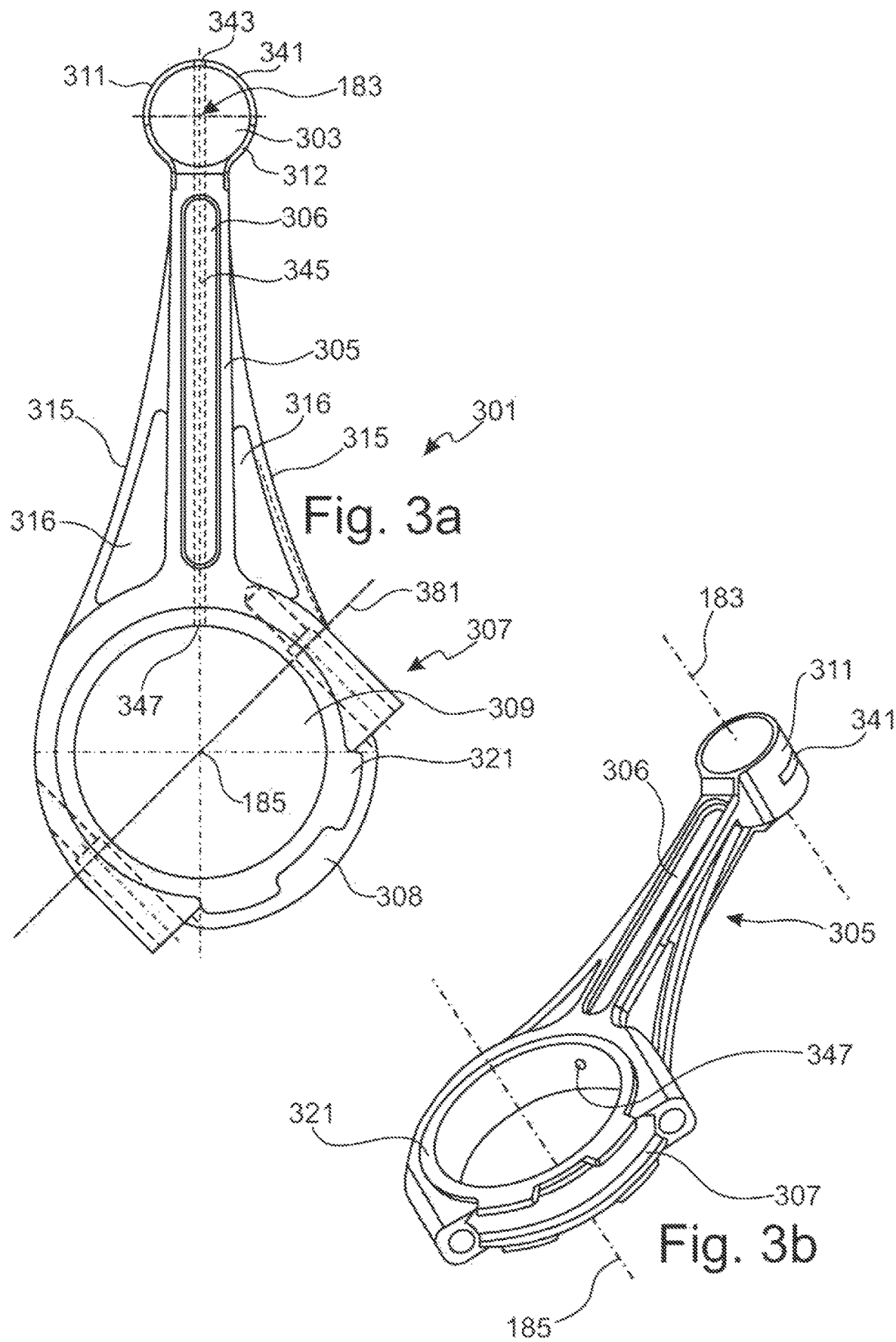

CONNECTING ROD, PISTON, CRANK DRIVE, AND RECIPROCATING INTERNAL COMBUSTION ENGINE

CROSS-REFERENCES TO RELATED APPLICATIONS

This is a U.S. national stage filing based on PCT/EP2022/087641

STATEMENT REGARDING FEDERALLY SPONSORED RESEARCH OR DEVELOPMENT

Not applicable

MICROFICHE APPENDIX

Not applicable

BACKGROUND OF THE INVENTION

The invention relates to a connecting rod, in particular for a prime mover, with a head section, a middle section and a foot area. The head area is rotatably connected to a piston about a swivel axis. The head area of the connecting rod is rotatably received within a connecting rod receptacle of the piston having an undercut corresponding to a thickening of the piston. The foot area of the connecting rod has a crankshaft eye creating a second connection between the foot area and a crank pin of a crankshaft. The head region of the connecting rod is connected to the foot region by a middle region. The invention also relates to a piston, in particular for a power machine, with an upper side, a lower side and a circumferential side surface, wherein the circumferential side surface is configured to guide the piston in a cylinder bore and the upper side is designed for absorbing pressure forces of a gas combustion event in a combustion chamber. On the lower side of the piston is a connecting rod receptacle with a connecting rod holder having a swivel axis substantially perpendicular to the cylinder bore. The connecting rod holder includes an undercut arranged to receive the connecting rod head by laterally sliding the connecting rod head into the connecting rod receiver. The connecting rod is then able to swivel relative to the piston about the swivel axis. Furthermore, the invention relates to a crank mechanism, in particular for an engine and/or for a reciprocating internal combustion engine and a reciprocating internal combustion engine.

Known engines that work according to the reciprocating piston principle, for example diesel engines or gasoline engines, usually have a piston with a connecting rod pivotally attached to the piston. The piston and the head of the connecting rod each include a transverse bore. A piston pin is passed through the transverse bore in the piston and the aligned transverse bore through the head of the connecting rod in order to pivotally connect the piston to the head of the connecting rod. This arrangement means that in a reciprocating piston internal combustion engine, significant reciprocating mass is present in each cylinder, comprising the piston and the piston pin. This has a negative effect on the efficiency of the engine and thus prevents the reduction of pollutant emissions.

Pistons and connecting rods are known in which the so-called head of the connecting rod has a thickening that can be hooked or pushed into a corresponding undercut in the piston so that the piston pin can be dispensed with. These designs have generally been deemed impractical due to the assembly safety, the insufficiency of lubrication in the joint between the connecting rod and the piston, and manufacturing considerations.

With such piston/connecting rod connections, for example, it is not possible to ensure cooling and lubrication of the joint between the connecting rod head and the piston by means of spray oil cooling, in particular piston crown cooling by means of spray oil starting from the vicinity of the crankshaft. For this reason, the advantages of a direct connecting between the connecting rod and the piston (without using a piston pin) cannot be utilized without overheating and possible seizing of the swiveling joint.

The object of the invention is to improve the state of the art.

BRIEF SUMMARY OF THE PRESENT INVENTION

This task is solved by a connecting rod, in particular for a prime mover, with a head region, a middle region and a foot region. The head region has a top section, a middle section, and a bottom section. The head region is pivotally connected to piston along a swivel axis (a first connection). The head region is rotatably connected to the piston via a connecting rod receptacle of the piston having a rear section corresponding to a thickening. The foot region of the connecting rod has a second connection for receiving a crankshaft pin. The head area of the connecting rod is located above the middle region of the connecting rod and has a lubricant guide that connects the connecting rod's second connection to the connecting rod's first connection in a fluid-carrying manner, so that a lubricant that is applied to the second connection in the region of the crank shaft crank pin is guided through the lubricant guide to the first connection between the head of the connecting rod and the piston, and the lubricant is present for lubricating and/or cooling the first connection.

With just a few changes as proposed in the present invention, such an arrangement of known connecting rods, namely the provision of a lubricant guide along the connecting rod, ensures that the first connection between the connecting rod and piston is safely lubricated and/or cooled.

The following terms are explained in this context:

A "connecting rod" is used in a so-called "crank drive" to connect a reciprocating piston within a cylinder to the crankshaft. The connecting rod head is pivotally connected to the piston. The connecting rod foot area is rotationally connected to a crankpin journal on a crankshaft.

A "connection" describes a mechanical connection, and in particular a pivoting connection between the piston and the connecting rod. The connection between the piston and the connecting rod in the present design of a piston and a corresponding connecting rod is designed to be form-fitting and rotatable about the pivot axis.

A "thickening" of the piston is such a region which has a larger or wider cross-section or a larger or wider diameter than an adjacent region. In particular, such a thickening can serve, together with the undercutting, to form a positive-locking, tension- or compression-resistant connection between the piston and the connecting rod.

A "swivel axis" is, for example, the axis around which the connecting rod is rotatably or pivotably connected to the piston. This swivel axis corresponds, for example, to the axis of the piston pin in the prior art designs.

A "piston" is a movable component which, together with a surrounding housing, in the case of a prime mover a "cylinder", forms a sealed cavity, whereby a volume of the cavity is changed by the position of the piston in the cylinder. Such a principal can be realized in different designs, in the case of the present invention in particular a reciprocating piston moving up and down within a cylinder.

An "undercut" refers to such a design of a mount or part of a mount in which a component or an area or partial area in the direction of force positively prevents a pull-out or positively enables a transmission of forces. Such an undercut can be used by a component attached via the undercut to transmit forces.

A "connecting rod holder" on the bottom of the piston is used to attach a connecting rod to the piston in a tension-proof and pivotable manner, so that the piston together with the connecting rod are linked together in a so-called crank drive, for example in a connecting rod linking a piston to a crankshaft. A pivoting connection of the piston to the connecting rod is established in such a way that the piston is non-positively connected to the connecting rod at the connecting rod holder.

A "crankshaft" is a series of several crankpins on a common shaft with a central axis of rotation, whereby a respective connecting rod is connected to each crankpin, with each connecting rod acting on a piston. The crankshaft can then be rotated by means of gas pressure on the pistons driven through the connecting rods. Such a crankshaft in a combustion engine has a central oil guide with outlets for lubricating the crankshaft main bearings.

A "lubricant channel" describes an exemplary channel-like or tubular design of a section of the connecting rod so that lubricant can be safely guided, i.e. reliably transferred from a start area to an end area. In particular, such a lubricant guide is, for example, a channel-shaped cavity or channel in the connecting rod.

A "lubricant" is used for lubrication and serves in particular to reduce friction, wear and/or direct material contact. Furthermore, a lubricant can also be used for vibration damping and/or for sealing or as corrosion protection. A lubricant can also serve as a coolant.

Such a lubricant is, for example, a lubricating grease, a lubricating oil or, in connection with a reciprocating piston internal combustion engine, in the simplest case the oil contained in an oil pan or an oil tank for lubricating the engine.

In particular, "lubrication" describes the rheological properties of the lubricant, i.e. a reduction in friction, wear and/or direct material contact, whereas "cooling" describes the removal of heat in particular from the area of the first connection. The heat removal process involves a heat transfer into the lubricant and a corresponding removal of the lubricant from the area to be cooled.

To make the connecting rod particularly simple, the lubricant guide runs in the form of a lubricant channel, with the lubricant channel running in particular along the central area of the crankshaft. Such a lubricant channel can, for example, be a bore running along the center area of the connecting rod from the foot area to the connecting rod head. The lubricant channel is located proximate the neutral plane in tension and compression, thereby minimizing any weakening of the structure of the connecting rod.

In one embodiment, the lubricant feed runs from a crankshaft eye associated with the second connection to the connecting rod head, in particular from an inner surface of the crankshaft eye to an outer surface of the connecting rod head.

With this embodiment of the invention, for example, a quantity of pressurized oil already present inside a hollow crankshaft can be used to lubricate the crankshaft main bearing journals and the crankshaft crankpin journals. For this purpose, a corresponding bore or hole can be provided in the crankpin journal and in a corresponding bearing shell inserted in the crankshaft eye of the connecting rod. Pressurized engine oil escaping from the crankshaft crankpin journals can be fed through the bearing shell in the crankshaft eye, through the lubricant channel in the connecting rod, and up to the connecting rod head where it lubricates the pivoting connection between the connecting rod head and the piston. The transported oil serves both a lubricating and a cooling function.

In order to be able to manufacture the connecting rod particularly reliably and easily, the lubricant channel is inserted into the connecting rod by means of spark erosion (electro discharge machining) and/or deep drilling.

Electro discharge machining, which is also referred to as "spark erosion" can be used for high-precision material processing. For this purpose, the electrically conductive workpiece to be machined is held in a dielectric liquid. The tool is brought into the vicinity of the material and a voltage difference between the tool and the workpiece is used to generate sparks by means of a local discharge between the tool and the workpiece and these sparks remove material from the workpiece.

In particular, a channel-like, eroded hole for the lubricant channel is produced by means of a rod-shaped tool during the electro discharge machining process.

In contrast, "deep drilling" can also be used as a special machining operation to create the lubricant channels. Deep drilling is characterized by the fact that the drilling depth is many times greater than the diameter of the resulting channel.

In one embodiment, the lubricant channel has a lubricant reservoir on the connecting rod head, particularly on an external surface of the connecting rod head where it attaches to the piston.

The presence of the lubricant reservoir allows a corresponding retention of lubricant, i.e. an additional available lubricant quantity in the area of the connecting rod head. This additional lubricant can also be used, for example, as a hydraulic cushion to prevent direct workpiece contact between an inner surface of the undercut on the piston and the outer surface of the connecting rod head.

A "lubricant reservoir" can be provided, for example, as a recess in a surface of the connecting rod head.

A valve device can also connecting rod head. This valve device is used to control a lubricant that is introduced into the lubricant channel at the second connection in the area of the crankshaft and it regulates lubricant flow to the first connection by means of the swiveling connection between the connecting rod head and the piston.

Consequently, the valve device can be used to control the amount of lubricant delivered depending on the angle at which the connecting rod head pivots with respect to the piston about the pivot axis, so that lubricating oil can only flow out of the reservoir when the connection between the piston and connecting rod is unloaded or only slightly loaded, for example.

Further embodiments of this valve device on the connecting rod can be implemented analogously to the valve device of a piston of a further aspect of the invention described below.

In a further aspect, the task is solved by a piston, in particular for an engine, with an upper side, a lower side, and a circumferential surface, wherein the circumferential surface is designed to guide the piston in a cylinder bore and the upper side is designed to absorb pressure forces of a gas in a cylinder. The underside has a connecting rod holder with an undercut with a cross-section arranged essentially parallel to a pivot axis defining the pivoting connection between the piston and the connecting rod head. The pivot axis is oriented transversely to the direction of tension and compression forces exerted by the piston. The connecting rod holder is configured to be a close sliding fit for the corresponding connecting rod head-thereby creating a pivoting connection. The connecting cod head, according to one of the previously described embodiments, includes a valve device for controlling the flow of lubricant through the lubricant channel to the first connection by swiveling the connecting rod head around the first connection swivel axis.

As with the possible arrangement of the valve device on the connecting rod, such a valve device serves to actively regulate the lubricant flow depending on an angular position of the connecting rod with respect to the piston. For example, only at those moments when a corresponding load between the piston and connecting rod is particularly low or reduced during one revolution of the crankshaft is lubricant allowed to escape, Thus, for example, the lubricant flow through the valve device is prevented when the connection between the piston and the connecting rod is heavily loaded by a combustion process in the cylinder, so that corresponding lubricating oil also remains in a lubricant reservoir, for example, and then, with a relief of the load on the piston, in a different angular position of the crankcase, the heated lubricating oil flows out of the first connection.

As already mentioned, it is irrelevant whether the valve device and/or the lubricant reservoir are located on the connecting rod head or inside the connecting rod holder of the piston.

In one embodiment, the valve device has a control pocket inserted into an inner surface of the undercut of the piston or several control pockets inserted into an inner surface of the undercut. The piston has control pockets inserted in the cylinder bore and/or in the area of an upper pressure point and/or in the area of a lower pressure point of the piston in the cylinder bore and/or an essentially rectilinear contact surface. Depending on the angle of the connecting rod in relation to an axis of movement of the piston in the cylinder bore, the lubricant flow is limited or prevented.

Such a control pocket or reservoir can be created using simple mechanical means, for example with a milling process, a spark erosion process, or casting of the pocket during casting of the connecting rod and/or the piston. It is therefore an inexpensive addition. As already mentioned above, it is irrelevant whether such a control pocket is located inside the connecting rod, i.e. inside the connecting rod head, or inside the piston, or some combination of the two. It is also conceivable that part of the control pocket is arranged in the connecting rod and another part of the control pocket is arranged inside the piston.

The geometry of the control pocket is selected in such a way that, for example, it is determined purely mechanically when a flow of lubricant occurs. For example, lubricant can be allowed to flow out of the pocket only during a respective dead point of the piston (a region of travel where the piston is relatively unloaded) in the cylinder bore and/or in the area of an essentially rectilinear arrangement of the connecting rod in relation to an axis of movement of the piston. Conversely, lubricant flow can be restricted when the piston is under significant load.

This enables active and controlled lubrication and cooling of the first connection between the piston and connecting rod, which in particular improves heat dissipation from the connecting rod. The combustion chamber is optimized and therefore the piston is designed with few thermal reserves and can therefore be very light. This reduction in weight significantly increases the efficiency of a corresponding reciprocating piston combustion engine.

In this context, the valve device, in particular the control pocket, can be arranged and/or designed in such a way that for an angle of ±20°, ±15°, ±10° and/or ±5° between a longitudinal axis of the connecting rod and the axis of movement of the piston in the cylinder bore the lubricant flow is limited.

This configuration defines corresponding angles in such a way that, in particular, a full rotation of the crankshaft is used to control corresponding control areas of the valve device and/or the control pocket in accordance with the invention. Angle specifications here refer to a full angle of 360° (one complete revolution of the crankshaft).

With a view to particularly effective cooling and lubrication of the piston, the connecting rod holder can have at least one lubricant channel extending away from the undercut or an inward cut surface of the undercut up to the circumferential surface and/or up to one or more annular grooves arranged or formed in the circumferential surface. The lubricant channel or channels can be fed via the lubricant feed channel formed in the connecting rod. The lubricant can be fed in a suitable manner, to cool the piston in a particularly effective manner during operation of an internal combustion engine.

For example, two lubricant channels can be provided in the connecting rod holder of the piston so that, depending on the angular position of each lubricant channel with respect to the pivoting connecting rod head, the two channels are alternately supplied with lubricant via the lubricant channel of the connecting rod. At a point in time at which one of these lubricant channels in the piston is supplied with lubricant via the lubricant channel in the connecting rod, the other lubricant channel is separated from the feed and vice versa. This ensures that the two lubricant channels are supplied alternately. In an intermediate state, in which the connecting rod is essentially in a centered position, the lubricant is supplied to both lubricant channels in the piston. When the connecting rod is near parallel alignment with the cylinder bore, both lubrication channels in the piston's connecting rod holder can be separated from the lubricant feed in the connecting rod head, so that lubricant pressure builds in the pivoting joint between the connecting rod head and the connecting rod holder of the piston. Thus, depending on the angular position of the connecting rod, lubricant is retained under pressure within the piston to connecting rod joint (during times of high pistol load) or delivered through the lubricant channels in the piston up to the circumferential surface and/or the ring grooves of the piston (during times of low piston load). Depending on the angular position of the connecting rod, the pressure ratios in the two lubricant ducts change accordingly.

The lubricant can pass through the piston up to of its circumferential surface and/or its annular grooves and emerge from the piston there from the circumferential surface or in the area of the annular grooves in order to ensure particularly effective lubrication of the piston in the cylinder. Any lubricant that escapes can then be discharged in the direction of the crankshaft and/or oil pan, where it can cool down. From there, it can be returned via the oil distribution scheme to the connecting rod and its lubricant feed into one or more lubricant ducts of the piston. As a result, a lubricant circuit is realized from the foot area of the connecting rod through the lubricant channel in the connecting rod and to and through the piston, after which it is returned to the sump.

With the realization of two such lubricant channels in the piston, there are two such circuits in which—depending on the arrangement of the lubricant channels in the piston—lubricant flows in opposite directions from the piston to its circumferential surface and/or annular ring grooves.

With regard to particularly effective cooling and lubrication of the piston, a lubricant channel can have several outlets in the circumferential surface and/or in the area of the ring grooves. Lubricant can be fed in through one or more inlets and out through several outlets.

Furthermore, with a view to particularly effective lubrication and cooling of the piston, an outlet or end of the at least one lubricant channel can be inserted into a groove formed in the circumferential surface or in the area of the annular ring grooves or a recess on the side of the piston. Such a recess can be the outlet and can have a larger diameter or a larger surface area than a cross-sectional area of the outlet or the end of the lubricant channel. For example, the outlet can have an essentially rectangular shape. Lubricant can accumulate in the recess and form a safety reservoir for supplying the peripheral surface of the piston with lubricant. Depending on the requirements, several such recesses can be made in the circumferential surface of the piston, thereby providing lubrication in a particularly effective way. At least one outlet or one end of a lubricant channel should open into the area to be lubricated.

Furthermore, with a view to particularly effective cooling and lubrication of the piston, at least one lubricant channel can lead into at least one buffer chamber having a larger cross-sectional area than the lubricant channel. Such a section or buffer chamber can be used as a safety reservoir to accumulate a suitable amount of lubricant in order to ensure a sufficient supply. This ensures a more reliable supply of lubricant through the lubricant channel and thus reliable cooling and lubrication at the desired positions inside and outside the piston.

Specifically, the at least one buffer space can be essentially spherical in shape or the at least one buffer space can be elongated and/or curved in the region of one or more annular grooves arranged or formed in the circumferential surface of the piston. The size and location of the desired buffer space must take into account other spatial and design considerations in that region for the piston as a whole.

Also with regard to a particularly effective cooling and lubrication of the piston, the at least one lubricant channel can have a branch with a branching channel for guiding lubricant in the direction of an area adjacent to the top of the piston. Such a branch enables further distribution of the lubricant in the piston. Lubricant can thus be directed towards the top of the piston where, due to combustion in a combustion chamber adjacent to the top of the piston, more cooling is needed. The piston is usually exposed to particularly high temperatures in the adjacent combustion chamber. The branching channel and thus a guide for the lubricant inside the piston can run past the top of the piston without being connected to the combustion chamber top side.

Rather, the branching channel can extend after passing through the area of the top of the piston back to the are of the undercut, up to an inner surface of the undercut, up to the underside of the piston or with an outlet up to another area of the piston. By designing the branching channel in this way, the lubricant fed through the hotter parts of the piston is released into an area below the piston or on the underside of the piston. From there, the lubricant can be returned in the direction of a crankshaft and the lower end of the engine. The lubricant can then be reused. The lubricant is fed back through the lubricant channel of the connecting rod into the lubricant channels in the piston and also into the branch channels.

In the area adjacent to the top of the piston, a buffer chamber for lubricant connected to the branch channel can be formed to ensure particularly effective cooling of the piston in this area. This buffer chamber can be designed as an extension or bulge of the branch channel.

Alternatively or in addition to this, the junction between lubricant channels can be an essentially spherical buffer space. In practice, it has been shown that this can ensure particularly reliable guidance of the lubricant without, for example, the formation of bubbles in the lubricant.

In a further aspect, the invention is applied to a crank mechanism, in particular for a prime mover and/or for a reciprocating piston internal combustion engine, with a piston, a connecting rod, and a crankshaft, wherein the piston is designed according to one of the previously described embodiments and/or a connecting rod according to one of the above-described embodiments.

Such a crank drive can be used, for example as a pre-mounted assembly, to prepare a very efficient reciprocating piston internal combustion engine.

In a further aspect, the invention can be applied to a reciprocating piston internal combustion engine, in particular a diesel engine or a spark-ignition engine, with a piston according to one of the previously described embodiments, a connecting rod according to one of the previously described embodiments and/or a crank mechanism as previously described.

In this context, a "diesel engine" describes an internal combustion engine that operates by means of compression ignition, whereas a "gasoline engine" uses a spark ignition for example by means of an electric spark. Mixed forms are also possible.

The invention is explained in more detail below with reference to the included drawing figures.

BRIEF DESCRIPTION OF THE SEVERAL VIEWS OF THE DRAWINGS

FIG. 3a is a side elevation view, showing the connecting rod from the assembly of FIG. 1.

FIG. 3b is a perspective view, showing the connecting rod from the assembly of FIG. 1.

DETAILED DESCRIPTION OF THE INVENTION

Figure 1:
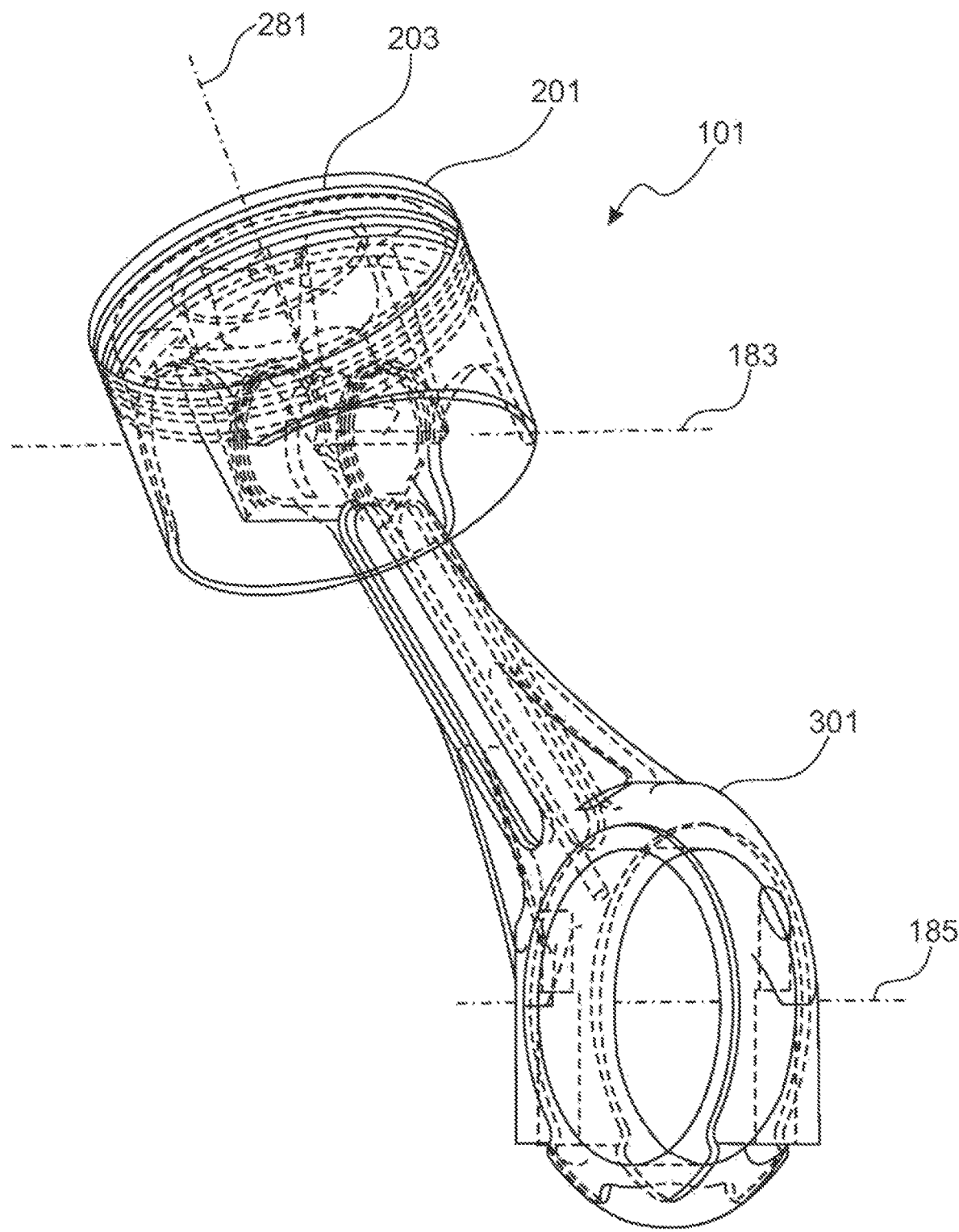
FIG. 1 is a perspective view including hidden lines, showing a crank mechanism including a piston and a connecting rod.

As shown in FIG. 1, a crank unit 101 has a piston 201 and a connecting rod 301. The crank unit 101 is part of a diesel engine (not shown), whereby the corresponding diesel engine has, for example, four, six, eight or even three crank units, whereby each of the pistons 201 are received movably along an axis of movement 281 within corresponding cylinders. The connecting rod 301 is mounted about a crank axis 185 on the respective crankpin of a crankshaft corresponding to the cylinder number. The Diesel engine, for example, is designed as an in-line four-cylinder, in-line six-cylinder or V-eight engine. In each case, this is a diesel engine with high-pressure injection for diesel fuel and a turbocharger and/or supercharger, resulting in high combustion temperatures in the respective cylinder, Other designs are of course also possible by means of the crank unit 101 in corresponding number. The piston 101 is made of an aluminum alloy.

The respective connecting rod 301 is forged from steel, then machined to a finished state. Swivel axis 183 defines the pivoting connection between the piston and the connecting rod. During a complete rotation of the crankshaft (not shown), the crankpin centered on crank axle 185 is guided on a circular movement and the piston 201 is moved up and down in the cylinder by means of the connecting rod 301 and thus a complete rotation of the crankshaft is carried out. Gas pressure generated on an upper side 203 of the piston 201 by the combustion of injected diesel, for example, drives the piston 201 so that the engine as a whole is operated according to the diesel principle. The ignition of the injected diesel fuel is achieved by compressing the intake air in the cylinder; the compression temperature is over 700° C. and the resulting combustion temperature is over 1,200° C. Piston 201 is subjected to intense heat and suitable cooling is a design objective in any internal combustion engine.

Figure 2A:
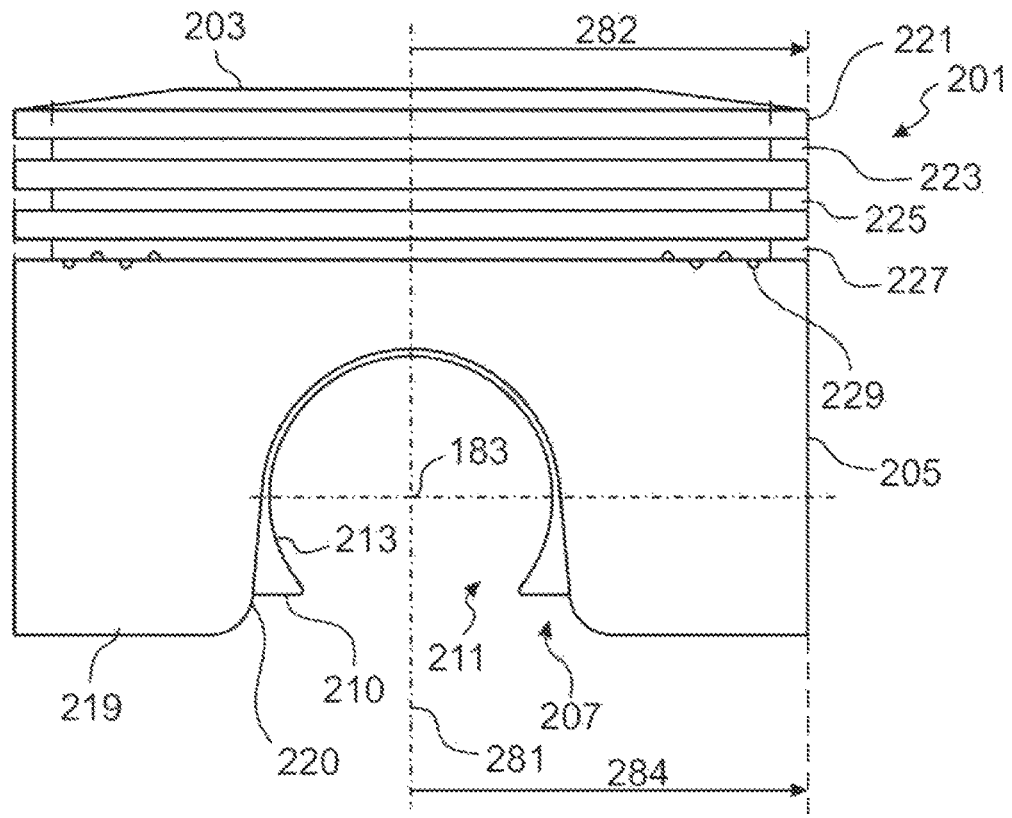
FIG. 2a is a side elevation view of the piston from the assembly of FIG. 1.
Figure 2B:
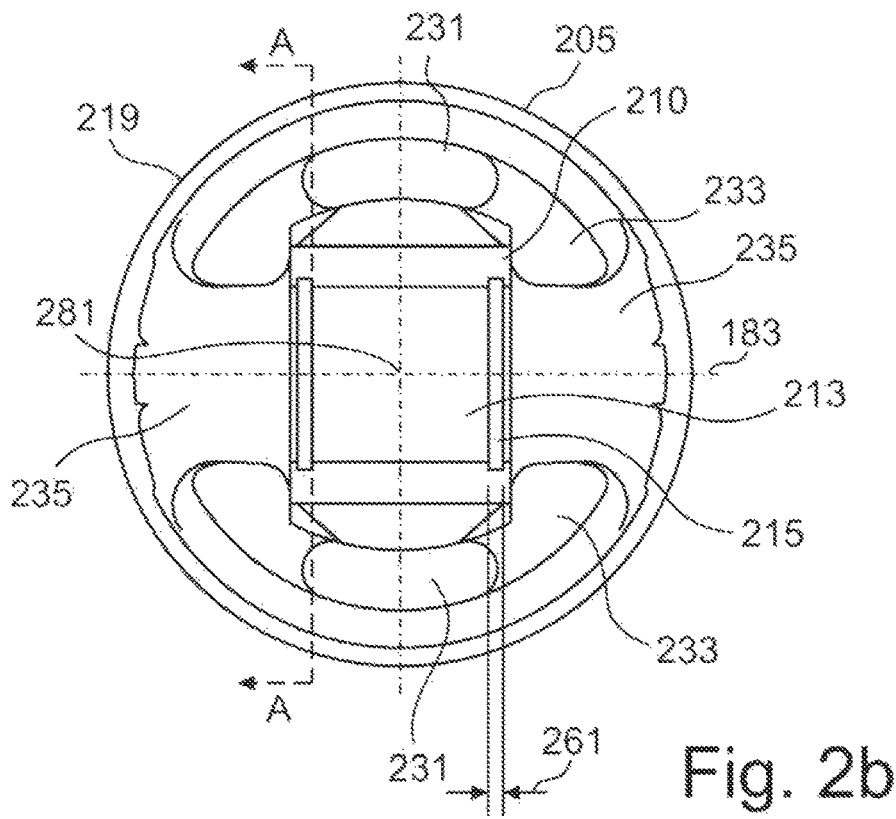
FIG. 2b is a bottom view showing the piston from the assembly of FIG. 1.
Figure 2C:
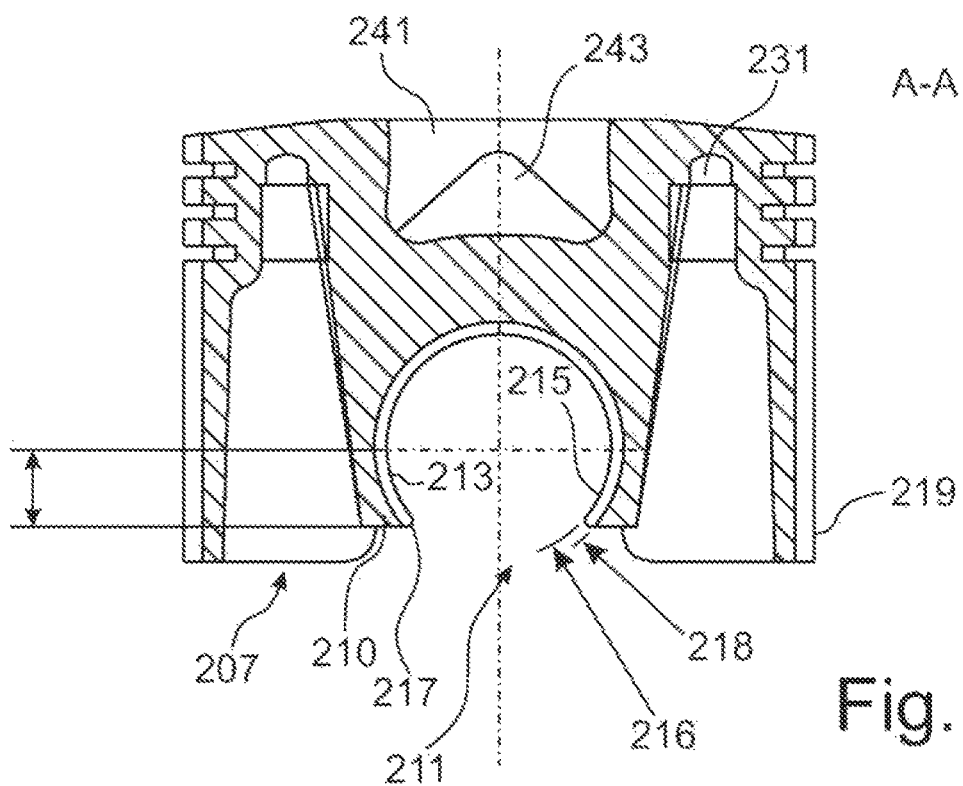
FIG. 2c is a side elevation sectional view showing the piston from the assembly of FIG. 1.

In addition to the upper side (crown) 203 directed towards the combustion chamber in the cylinder, the piston 201 has a circumferential surface 205 and a lower surface 207 (see FIG. 2a). Within the top surface, concentric to the axis of movement 281, a combustion cavity 241 is provided (see FIG. 2c). A cone-shaped dome 243 extends upward within the combustion cavity, which enlarges the surface area of the combustion cavity of the piston 201.

A predominant component of the circumferential surface 205 forms a piston skirt 219 (see FIG. 2c), which descends in the direction of the underside 207. The piston skirt is cylindrical and has thin walls. Starting from the upper side 203 (see FIG. 2a), the piston 201 has narrow circumferential collar 221, which has a distance of the upper side 203 to form a first annular ring groove 223. A piston ring for sealing against the cylinder is arranged within this first annular ring groove 223. Further in the direction of the underside 207, a second annular ring groove 225 and a third annular ring groove 227 is arranged, whereby in the annular groove 225 a piston ring is inserted as a sealing ring, in the annular groove 227 a piston ring in the function of an oil scraper ring (piston rings not shown in each case). Additional bores 229 are arranged on the annular groove 227, which promote the drainage of engine oil.

The circumferential collar 221 is known in the prior art in diesel engines as a so-called "firewall" and in these engines is designed in the prior art with a significantly smaller diameter than the circumferential surface 20 of a piston. However, the circumferential 221 in the collar inventive embodiment of FIG. 2a has a radius 282, this radius 282 being to of radius the identical 284 circumferential surface 205 within technical tolerances. The piston 201 can thus be machined with respect to its cylindrical shape in a single clamping operation and in a single turning operation on a lathe to a uniform diameter.

The circumferential collar 221 can be designed in this form because the present invention provides additional cooling in order to limit thermal expansion. Collar 221 most be made as a reduced diameter in the prior art to account for increased piston crown heating that causes this area to expand significantly. The heat dissipation in the inventive piston eliminates the need for this.

On the underside 207, the piston 201 has a connecting rod holder 210 for engaging the connecting rod 301. The holder 210 is included essentially through an undercut 211 (see FIG. 2c) formed, which is concentric around the swivel axis 183 and is characterized by a respective edge 217 at the limit of the material. In order to keep the undercut 211 accessible along the pivot axis 183 and to enable the undercut 211 to be finished with the inner surface 213 of the connecting rod holder, the piston skirt 219 has a cut-out 220 on both sides along the pivot axis 183. This cut-out 220 allows the connecting rod head 303 (see FIG. 3a) to slide laterally into the connecting rod holder and pivotally engage inner surface 213 (see FIG. 2a). In addition, the presence of cut-outs 220 allows the insertion of a tool for fine machining of the inner surface 213.

As can be seen from the underside of the piston 201 (see also FIG. 2b), the piston 201 is not radially symmetric. In addition to the directly technical volumes of the piston 201, namely the volume for forming the connecting rod holder 210 with the undercut 211, the volume for the piston skirt 219 as well as corresponding volumes for other features vary. Piston 201 has areas of thickening 231, 235. The piston also includes numerous pockets 233. The thickenings and pockets are arranged symmetrically to the swivel axis 183. The corresponding volumes of the thickenings 231, the pockets 233 and the thickenings 235 are selected in such a way that both the pockets 233 and the thickenings 235 can be the intersecting surfaces through the axis of movement 281, i.e. for example, such cut surfaces formed along a cutting plane 271, a cutting plane 273 or a cutting plane 275 (see also FIG. 2d), each with the same cross-sectional area within a tolerance of, for example, 2% in relation to the cutting plane 271 to, for example, the smallest of the respective comparative intersecting surfaces. This geometric design ensures that the thermal expansion behavior of the piston 201 is almost identical or even identical in different polar positions around the axis of movement 281. For this purpose, material is added to the thickenings 231 and material is subtracted from the pockets 233 and material is applied to the thickenings 235. In this way, for example, technically required volumes, such as for the connecting rod holder 210, applied in the respective cutting planes are accordingly balanced. Likewise, for example, a respective thickening 235 is provided to at least partially offset the loss of cross-sectional area over the area at the cut-out 220 and missing material in the piston skirt 219. Correspondingly, other components are also compensated for by subtracting or adding corresponding volumes of the material of the piston 201 to keep the piston balanced.

Within the inner surface 213 of the undercut 211, annular retaining ring grooves 215 are provided on both sides along the pivot axis 183 (see FIG. 2b) symmetrically to the axis of movement 281, wherein these annular grooves are formed as partial annular grooves 215 due to the shape of the undercut 211. The respective annular retaining ring groove 215 has a cross-section extending from a diameter 216 of the inner surface 213 up to a diameter 218 of the inner surface 213 (see FIG. 2c).

The connecting rod 301 (see FIG. 3a) has a connecting rod head 303, a middle region 305 and a crankshaft connection 307. The connecting rod head is designed as a bulge with a cylindrical outer surface 311. The outer surface 311 is a machined to be a close sliding and pivoting fit within inner surface 213 of the piston. Furthermore, chamfers 312 are arranged at end regions of the head 303 in the direction of the pivot axis 183. The connecting rod head 303 can thus be inserted laterally into the piston along the pivot axis 183 so that a swivel joint is created between the connecting rod and the piston about the pivot axis 183.

The middle region 305 connects the connecting rod head 303 with the crankshaft connection 307 and has a central neutral plane between the connecting rod head 303 and the crankshaft connection 307. Middle region 305 also has a recess 306 on both sides, so that overall, a rigid cross-section of the middle region 305 is formed as a double T-beam. In addition, webs 315 with recesses 316 formed opposite the middle region 305 are arranged in such a way that the middle region and the crankshaft connection 307 are rigid and yet as light as possible.

Approximately half of the crankshaft connection 307 consists of a part of the connecting rod 301. The other half consists of connecting rod cap 308, with the two components being arranged concentrically around the crankshaft axis 185. In order to produce a low-friction, wear-resistant and emergency-running connection to the crankshaft, a bearing shell 321 is provided on the inner surfaces of the crankshaft eye 309. The bearing shell is provided with features that rotationally fix its position in relation to the connecting rod 301 and rod cap 308.

In addition, the connecting rod 301 has a smaller diameter valve groove 341 on the outer surface area 311 of the connecting rod head 303 (see FIG. 3b). Valve groove 341 is connected to an outlet opening 343 (see FIG. 3a). The outlet opening 343 is part of an oil channel 345, which is located between the outlet opening 343 and an inlet opening 347 arranged inside the crankshaft eye 309. The oil channel 345 is located along the neutral plane of the middle region 305 (the plane where the metal grains are neither in compression nor in tension in normal operation), so that middle region 305 is weakened as little as possible by oil channel 345, in particular against bending.

To fit the connecting rod 301 with the piston 201, the connecting rod head 303 is pushed laterally into the piston's undercut 211 (see FIG. 2a) along the pivot axis 183. Within the annular retaining ring groove 215, an elastic retaining ring with a round wire cross-section is inserted in such a way that part of the retaining ring (not shown) is inserted into the cross-section of the undercut 211 formed by the inner surface 213. This retaining ring is then pushed back into the annular groove 215 by means of the chamfer 312 on the connecting rod head 303, whereby the cross-section of the retaining ring is selected in this way, that it can be positioned completely between the diameter 216 and the diameter 218.

The chamfer 312 thus facilitates the insertion of the connecting rod head 303 into the piston 201. The use of the retaining rings in the retaining ring grooves 215 secures the connecting rod head 303 against unintentional removal from the piston along the pivot axis 183.

The function of the crank unit 101 with regard to the lubrication of the connection between connecting rod head and piston 201 in undercut 211 is explained as follows:

Inside the crankshaft, which is not shown, there is an oil channel running for lubricating the corresponding bearing points of the crankshaft. Crankshaft oil outlet holes are provided at the bearing points. The crankshaft also has corresponding outlet holes for pressurized engine oil on the crankpin journals, which accommodate the respective connecting rod 301 around the crank axis 185. The engine oil is then fed into a circumferential annular groove on the crankshaft and flows through the inlet opening 347 (see FIG. 3a) into the oil channel 345 to the outlet opening 343. With the outlet opening 343 and the valve groove 341, an oil reservoir is created in which pressurized engine oil is stored for the lubrication of the pivoting interface between cylindrical surface 311 (on the connecting rod) and cylindrical inner surface 213 (on the piston).

Furthermore, the valve groove 341 is used to control the oil flow depending on a position of the crankshaft and a resulting position of the connecting rod 301 with respect to the piston 201. When the piston 201 has reached top dead center ox bottom dead center, the connecting rod 301 is essentially vertical within the cylinder bore along the axis of movement 281. In that state, the valve groove 341 is completely sealed against the inner surface 213 of the undercut 211 so that no oil can escape through the valve groove 341. At this moment, for example when ignition of the fuel in the cylinder takes place, reliable lubrication and ideal lubrication are ensured and heat transfer between piston 201 and connecting rod 301 is ensured. Likewise, the oil cushion in the oil reservoir also prevents direct material contact.

On the power stroke the piston 201 is heated by the combustion gases and pushed downward. The crankshaft initially pivots from TDC by approximately 90° and the connecting rod 301 pivots with respect to the piston. The valve groove 341 is dimensioned in such a way that a part of the valve groove 341 is now released at an edge 217 of the undercut 211 (see FIG. 2c). At this moment, oil fed through the oil channel 345 under engine pressure is ejected from the open portion of valve groove 341. This oil has been heated s well and its discharge transfers heat away from the connecting rod/piston connection. In this state, the connection between the connecting rod head 303 and the undercut 211 is relatively lightly loaded, so that an escape of the engine oil can be used to advantage here, even if this means that less oil is available for lubrication.

If the crankshaft then approaches bottom dead center (180° from TDC), the undercut 211 closes the valve groove 341; at this moment, inertial forces of the crankshaft can therefore be applied. Further crankshaft rotation commences the exhaust stroke, and this is commenced with full oil pressure contained within the closed valve groove 341. At this point, there is also a further transfer of heat into the engine oil; at a crankshaft position of 270°, the oil pressure is then used to transfer heat out of the engine oil again as the valve groove 341 of the valve is opened by a portion of the valve groove 341 pivoting past edge 217. Up to a crankshaft position of 360° (full angle, corresponds to 0° or TDC), the valve groove 341 is then closed again by means of the edge 217, so that full oil pressure is again present in the connection at top dead center and the availability of renewed heat transfer to the oil dissipation is reached. This cycle is of course repeated with every revolution of the crankshaft, so that the result is sufficient lubrication of the movement around the pivot axis 183 as well as optimized heat dissipation from the connecting rod 301 and the piston 201.

Figure 4:
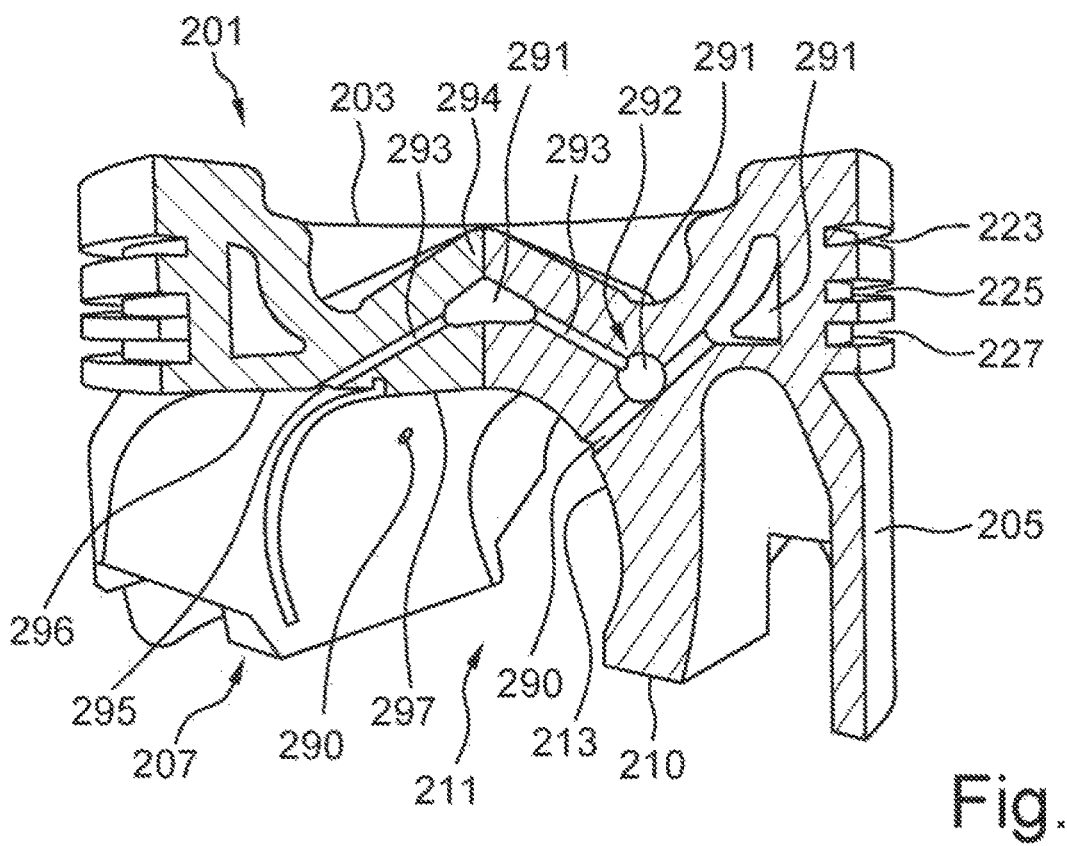
FIG. 4 is a perspective view with a cutaway, showing internal details of an embodiment of the inventive piston.
Figure 5:
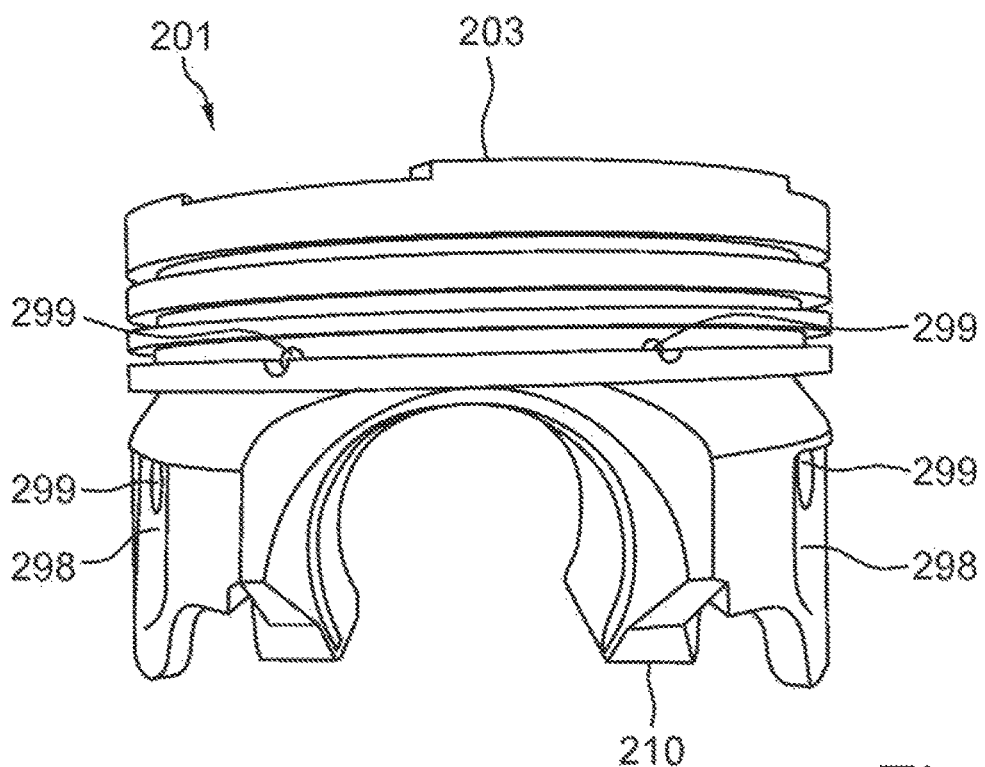
FIG. 5 is a perspective view, showing the piston of FIG. 4.
Figure 6:
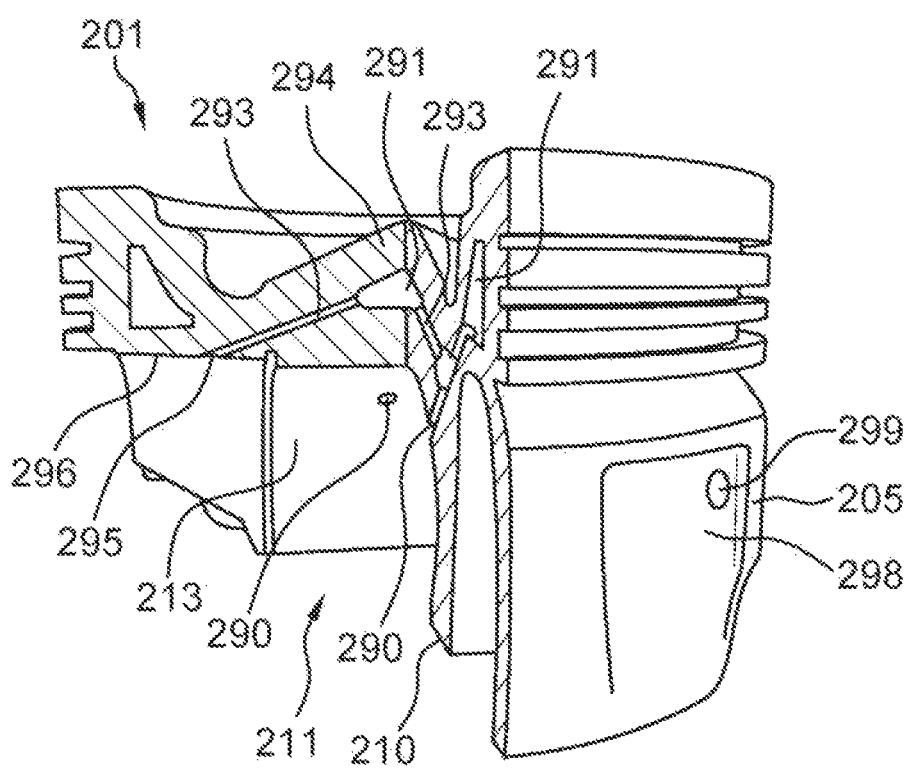
FIG. 6 is a perspective view with a cutaway, showing internal details of an embodiment of the inventive piston.

FIGS. 4 to 6 show in perspective side views and from different angles a further embodiment example of a piston 201 according to the invention, wherein the piston 201 shown, fox the sake of better illustration, with a partial cutaway to reveal internal details. The section planes in the piston 201 required for this are made on the one hand in the direction of the pivot axis 183 and on the other hand perpendicular to this direction.

Figure 2D:
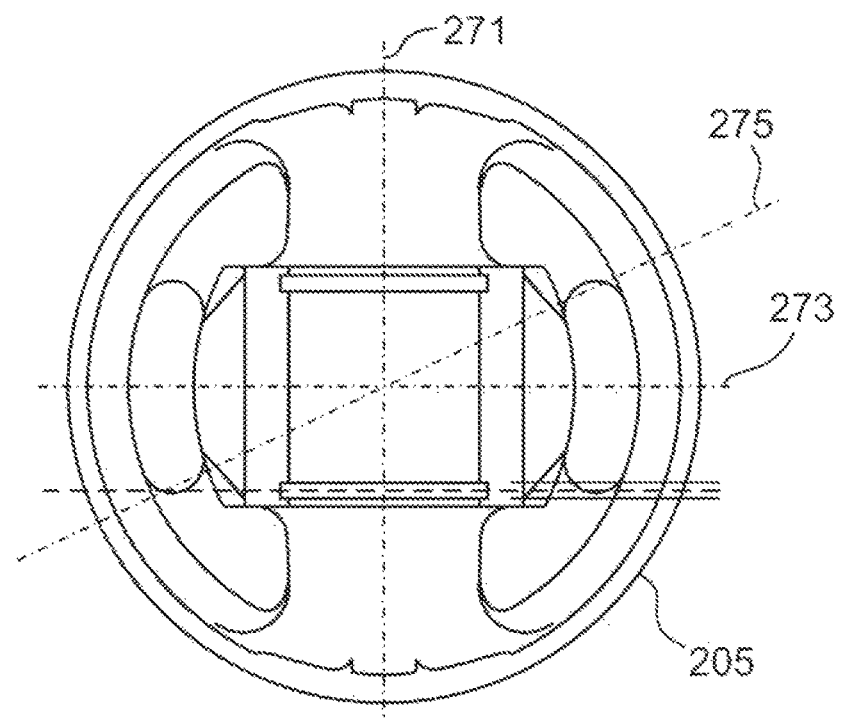
FIG. 2d is a bottom view showing the piston from the assembly of FIG. 1, with section plane callouts for FIGS. 4 and 6.

The piston 201 shown in FIGS. 4 to 6 has essentially the same external structure as the piston 201 shown in FIGS. 1 to 2d, so that the advantages explained with regard to the piston 201 described above also apply to the piston 201 described below. However, the piston 201 shown in FIGS. 4 to 6 differs from the piston 201 shown in FIGS. 1 to 2d in terms of its "inner workings".

Specifically, the connecting rod holder 210 has two lubricant channels extending from the inner surface 213 of the undercut 211 to the circumferential surface 205 and to annular ring grooves 223, 225, 227 arranged in the circumferential surface 205. In FIG. 4 it is particularly easy to see that the lubricant channels 290 extend in opposite directions. Thereby the one lubricant channel 290 is recognizable as if cut open and the other lubricant channel 290 is recognizable only by its inlet in the inner surface 213.

The lubricant ducts 290 initially run up to a substantially spherical buffer chamber 291. A branch 292 is formed there, which leads into a branch channel 293. Lubricant is fed through the branch channel 293 into a further buffer chamber 291 below the area of cone-shaped dome 294. Through this further buffer space 291, a lubricant reservoir to support the cooling of this area 294 is provided.

After passing through the further buffer space 291 proximate dome 294, the branching channel 293 continues in the direction of the rear buffer space 291 cutting edge 211 or towards the underside 207 of the piston 201, Branch-off channel 293 ends with an outlet 295 in an area 296 of the undercut 211, the area 297 of the undercut 211 and the area 297 of the undercut 211 in which the head 303 of a connecting rod 301 is pivotally mounted. The lubricant can therefore flow out of the branch channel 293 next to the connecting rod coupled to the piston 201.

Lubricant that is not fed from the essentially spherical buffer chamber 291 into the branch channel 293 is fed further into an outer buffer chamber 291, which runs in the area of the annular ring grooves 223, 225, 227 near the outer perimeter of the piston. This outer buffer chamber 291 has a curved shape that is substantially adapted to the outer circumferential surface 205 of the piston 201. The buffer chamber 291 extends essentially along half the circumference of the piston 201 and is therefore quasi half-ring shaped. Due to the fact that two lubricant ducts 290 are realized in the present embodiment example, two such outer curved buffer chambers 291 are also provided in the present embodiment multiple spaces 291 are realized, whereby each lubricant channel 290 leads into such a buffer space 291.

The lubricant is fed from the outer buffer chamber 291 to the circumferential surface 205 and to the annular ring grooves 223, 225, 227, whereby outlets 299 of the lubricant are located in the circumferential surface 205 (see FIG. 5). The outlets 299 are partially realized in recesses 298 of the circumferential surface 205. Such recesses 298 serve as lubricant reservoirs. In the embodiment shown here a total of four recesses 298 are realized in the circumferential surface 205, with an outlet 299 being realized in each recess 298, so that reliable filling of the recesses 298 with lubricant is ensured.

In the embodiment shown here, one branch channel 293 is realized from each of the two lubricant channels 290. Both branch channels 293 converge in the further buffer chamber 291 in the area of dome 294 or cross each other in this further buffer chamber 291. Both branch ducts 293 share the same buffer space 291 near the area of dome 294. This further buffer chamber 291 thus has a total of two inlets and two outlets, one for each branch-off channel 293 and one for each of the other branch-off channels 293.

In a simplified embodiment of the piston 201, it is also possible to continue the lubricant channel. 290 directly in the sense of the branch channel 293. In such an embodiment, the lubricant is not guided to the circumferential surface 205 of the piston 201, but is instead fed directly to the piston 201 but merely a guided tour-without any branching off from the undercut 211 or the inner surface 213 of the undercut 211 to the undercut 211 again, to the inner surface 213, to the underside 207 of the piston 201 or to an outlet 295 in a region 296 of the undercut 211. This would create a cycle or circular guidance of lubricant in the piston 201 or in the connecting rod holder 210.

Figure 7:
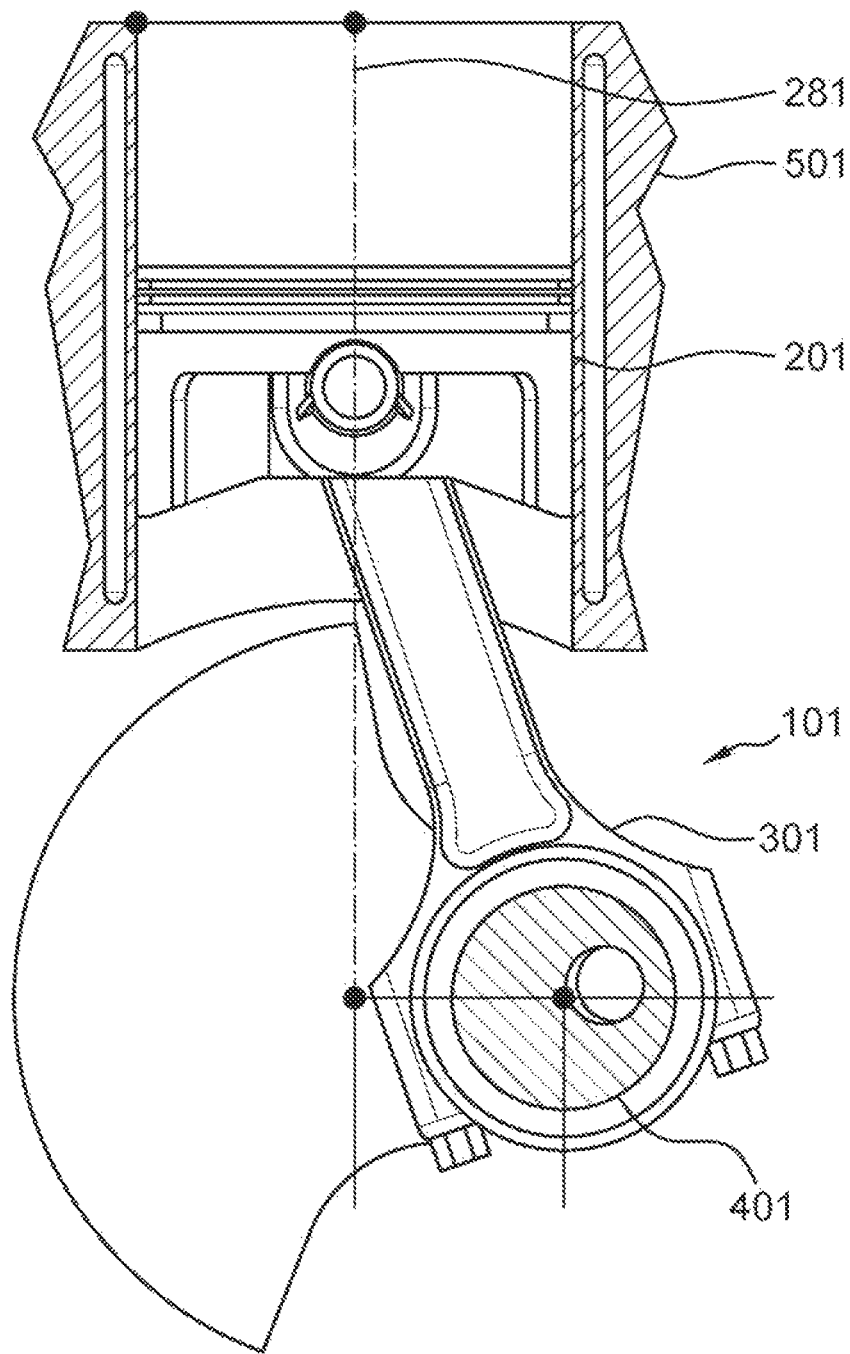
FIG. 7 is a side elevation view with partially shown sections, showing an embodiment of a crank drive made according to the present invention.

FIG. 7 shows a side view, partially sectioned, of an embodiment example of a crank mechanism according to the invention, wherein the crank mechanism comprises a piston 201 according to one of the embodiment examples described above and a piston 201 according to one of the embodiment examples described above a corresponding connecting rod 301 with an internally located lubricant guide—i.e. a crank unit 101—and a crankshaft 401. The connecting rod 301 is coupled to the crankshaft 401 in the usual manner. The piston 201 is arranged in a cylinder arrangement 501 along a movement movable along the axis 281.

Figure 8:
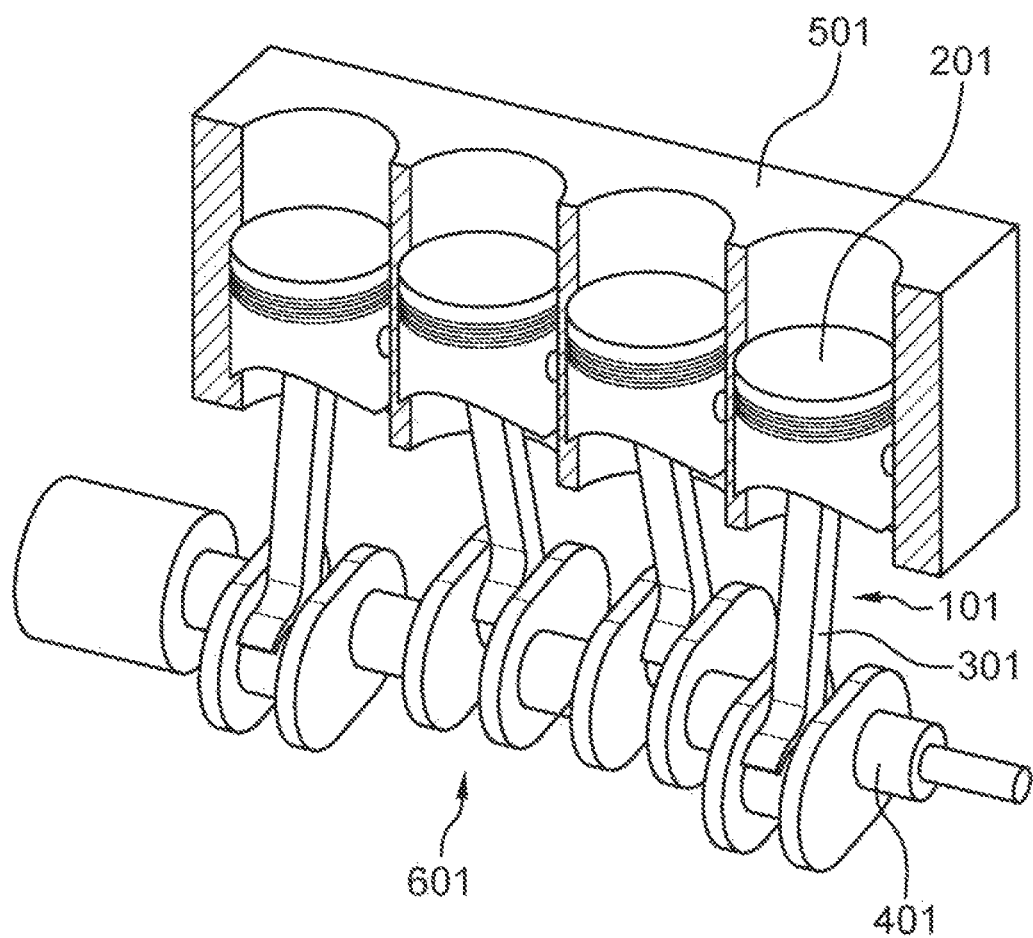
FIG. 8 is a perspective view with a partial cutaway, showing an internal combustion engine using crank assemblies as provided in the present invention.

FIG. 8 shows a perspective and partially sectioned view—in a detail—of an embodiment example of a reciprocating piston combustion engine 601 with a cylinder arrangement 501 with four cylinders to form a cylinder bank of an in-line four-cylinder engine and with pistons 201 and connecting rods 301 according to one of the above embodiments. In each case, a piston 201 and a connecting rod 301 form a crank unit 101. The connecting rod 301 is coupled to a crankshaft 401.

In the design examples shown in FIGS. 7 and 8, the "inner workings" of the piston 201 and the connecting rod 301 are not shown for the sake of clarity.

In this context, it should be noted that in all embodiments, the geometric design of the piston 201 also optimizes heat dissipation, as explained above. The central connection of the connecting rod 301 in the connecting rod holder 210 of the piston 201 enables good heat conduction, so that the "fire bar" known from the prior art can also be dispensed with. Together with the simple geometry and uniform roundness of the piston 201, this makes it possible to produce a diesel engine that is easy to manufacture and also very efficient.

As a result, the diesel engine can be operated with high combustion temperatures and thus reduced emissions and efficient combustion, as the geometry of the piston 201, the compact design and the centralized combustion cavity allows the engine to be operated at high combustion temperatures. The extra heat is dissipated into the connecting rod 301 and by means of the controlled oil flow throughout the rest of the engine. The circulating oil provides good thermal management. Overall, the combination of piston 201 and connecting rod 301 according to the invention thus reduced reciprocating masses. It should be noted that although this type of piston 201 and connecting rod 301 was shown in the present example for a diesel engine with high-pressure injection and a turbocharger, the same arrangement is suitable for other types of engines and machines—including gasoline engines and compressors.

REFERENCE NUMERALS IN THE DRAWINGS

101 Crank unit
183 Swivel axis
185 Crank axis (crank pin axis)
201 Piston
203 Top side (piston crown)
205 Circumferential surface
207 Underside (lower surface)
210 Connecting rod holder
211 Undercut
213 Inner surface
215 Retaining ring groove
216 Diameter
217 Edge
218 Diameter
219 Piston skirt
220 Cut-out
221 Perimeter collar (circumferential collar)
223 Ring groove (top compression ring groove)
225 Ring groove (second compression ring groove)
227 Ring groove (oil control ring groove)
229 Drill hole
231 Thickening
233 Pocket
235 Thickening
241 Combustion cavity
243 Cone-shaped dome
261 Width
271 Cutting plane
273 Cutting plane
275 Cutting plane
281 Axis of movement
282 Radius
284 Radius
290 Lubricant channel
291 Buffer chamber
292 Branch-off
293 Branch-off channel
294 Cone-shaped dome
295 Outlet
296 Area
297 Area
298 Recess
299 Outlet
301 Connecting rod
303 Connecting rod head
305 Middle range
306 Deepening (recess)
307 Crankshaft connection
308 Connecting rod cap
309 Crankshaft eye
311 Outer surface
312 Chamfer
315 Bar (web)
316 Recess
321 Bearing shell
341 Valve groove
343 Outlet opening
345 Oil channel
347 Entrance opening
401 Crankshaft
501 Cylinder arrangement
601 Reciprocating internal combustion engine

The invention claimed is:

1. A connecting rod (301), in particular for a power engine, having a head region (303), a middle region (305) and a foot region (307), the head region (303) having a pivoting first connection with a connecting rod receptacle (210) of a piston (201), the pivoting first connection corresponding to the head region (303) engaging an undercut (211) of the connecting rod receptacle (210) of the piston (201) and the foot region (307) has a second connection for receiving a crankshaft and the head region (303) is connected to the foot region (307) via the middle region (305), characterized in that the connecting rod (301) has a lubricant guide (343, 345, 347), so that a lubricant introduced into the lubricant guide (343, 345, 347) at the second connection in the region of the crankshaft is guided through the lubricant guide (343, 345, 347) to the first connection and the lubricant is available for lubricating and/or cooling the first connection, said head region (303) including a valve (341) in communication with said lubricant guide (343, 345, 347), said valve (341) characterized so that in the region of a top dead center or a bottom dead center said valve (341) limits lubricant flow, but away from said top dead center or said bottom dead center said valve permits increased lubricant flow.

2. The connecting rod (301) according to claim 1, characterized in that the lubricant guide (343, 345, 347) has a lubricant channel (345), wherein the lubricant channel (345) runs in particular along the middle region (305).

3. The connecting rod (301) according to claim 1, characterized in that the lubricant guide (343, 345, 347) at the second connection (307) carries lubricant to the head region (303), in particular from an inner surface of a crankshaft eye (307) to the head region (303).

4. The connecting rod (301) according to claim 1, characterized in that the lubricant guide (343, 345, 347) is introduced into the connecting rod (301) by means of spark erosion and/or by means of deep drilling.

5. The connecting rod (301) according to claim 1, characterized in that the lubricant guide (343, 345, 347) at the first connection has a lubricant reservoir as part of valve (341), wherein the lubricant reservoir (341) is incorporated in particular in an outer surface (311) of the head region (303) and/or is associated with the connecting rod receptacle (210).

6. A piston (201), in particular for an engine, having an upper side (203), a lower side (207) and a circumferential surface (205), the circumferential surface (205) being designed for guiding the piston (201) in a cylinder bore and the upper side (203) being designed for absorbing pressure forces of a gas in a cylinder, the underside (207) has a connecting rod receptacle (210) with an undercut (211) with a cross-section arranged substantially parallel to a pivot axis (183) in a tensile and pressure direction, and the connecting rod receptacle (210) is designed to receive, in a form-fitting manner and pivotably about the pivot axis (183), a connecting rod (301) corresponding to the connecting rod receptacle (210) according to claim 1.

7. The piston (201) according to claim 6, characterized in that the valve device comprises a control pocket or a plurality of control pockets formed in an inner surface (213) of the undercut (211), so that in particular in the region of a top dead center and/or in the region of a bottom dead center of the piston (201) in the cylinder bore and/or a substantially rectilinear arrangement of the connecting rod (301) in relation to an axis of movement (281) of the piston (201) in the cylinder bore, the lubricant flow is limited or prevented.

8. The piston (201) according to claim 6, characterized in that the valve device is arranged in such a way that the lubricant flow is limited for an angle of +/−5° between a longitudinal axis of the connecting rod (301) and the axis of movement (281) of the piston (201) in the cylinder bore.

9. The piston (201) according to claim 6, characterized in that the connecting rod receptacle (210) has at least one lubricant channel (290) extending from the undercut (211) or an inner surface (213) of the undercut (211) up to the circumferential surface (205) and/or up to one or more annular ring grooves (223, 225, 227) arranged or formed in the circumferential surface (205).

10. The piston (201) according to claim 9, characterized in that one end of the at least one lubricant channel (290) opens into a recess (298) formed in the circumferential surface (205) or in the region of the annular grooves (223, 225, 227).

11. The piston (201) according to claim 9, characterized in that in at least one lubricant channel (290) at least one section has a diameter that is larger than a diameter of the at least one lubricant channel (290) or at least one buffer chamber (291) for lubricant is formed.

12. The piston (201) according to claim 11, characterized in that the at least one buffer chamber (291) is essentially spherical in shape or in that the at least one buffer chamber (291) is elongated and/or curved in the region of one or more annular grooves (223, 225, 227) arranged or formed in the circumferential surface (205).

13. The piston (201) according to claim 9, characterized in that the at least one lubricant channel (290) has a branch (292) with a branch channel (293) for guiding lubricant towards a region (294) adjacent to the upper side (203) of the piston (201), wherein the branch (292) can be formed in a buffer space (291) and/or wherein the branching channel (293), after passing the region (294), extends as far as the undercut (211), as far as an inner surface (213) of the undercut (211), as far as the underside (207) of the piston (201) or, with an outlet (295), as far as a region (296) of the undercut (211) or connecting rod receptacle (210), which is formed next to a region (297) of the undercut (211) in which a head (303) of a connecting rod (301) is located in the operating state coupled to the piston (201).

14. A crank mechanism (101), in particular for a prime mover and/or for a reciprocating piston internal combustion engine (601), with a piston (201), a connecting rod (301) and a crankshaft (401), characterized by a piston (201) according to claim 6.

15. A reciprocating piston internal combustion engine (601), in particular a diesel engine or gasoline engine, comprising a piston (201) according to claim 6, a connecting rod (301) and a crank mechanism (101).

16. The piston (201) according to claim 6, characterized in that the valve device is arranged in such a way that the lubricant flow is limited for an angle of +/−20 degrees between a longitudinal axis of the connecting rod (301) and the axis of movement (281) of the piston (201) in the cylinder bore.

17. The piston (201) according to claim 6, characterized in that the valve device is arranged in such a way that the lubricant flow is limited for an angle of +/−15 degrees between a longitudinal axis of the connecting rod (301) and the axis of movement (281) of the piston (201) in the cylinder bore.

18. The piston (201) according to claim 6, characterized in that the valve device is arranged in such a way that the lubricant flow is limited for an angle of +/−10 degrees between a longitudinal axis of the connecting rod (301) and the axis of movement (281) of the piston (201) in the cylinder bore.

* * * * *